US009299360B2

(12) United States Patent
Arakawa et al.

(10) Patent No.: US 9,299,360 B2
(45) Date of Patent: *Mar. 29, 2016

(54) SPEECH PROCESSING APPARATUS, CONTROL METHOD THEREOF, STORAGE MEDIUM STORING CONTROL PROGRAM THEREOF, AND VEHICLE, INFORMATION PROCESSING APPARATUS, AND INFORMATION PROCESSING SYSTEM INCLUDING THE SPEECH PROCESSING APPARATUS

(75) Inventors: Takayuki Arakawa, Tokyo (JP); Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/979,596

(22) PCT Filed: Dec. 3, 2011

(86) PCT No.: PCT/JP2011/077997
§ 371 (c)(1),
(2), (4) Date: Jul. 12, 2013

(87) PCT Pub. No.: WO2012/096074
PCT Pub. Date: Jul. 19, 2012

(65) Prior Publication Data
US 2013/0297303 A1 Nov. 7, 2013

(30) Foreign Application Priority Data

Jan. 13, 2011 (JP) ................. 2011-005317

(51) Int. Cl.
*G10L 21/0208* (2013.01)
*H04R 3/00* (2006.01)
(Continued)

(52) U.S. Cl.
CPC ............ *G10L 21/0208* (2013.01); *H04R 3/005* (2013.01); *G10L 15/20* (2013.01); *H04R 1/342* (2013.01); *H04R 2410/05* (2013.01); *H04R 2499/13* (2013.01)

(58) Field of Classification Search
CPC ............... H04R 2499/13; H04R 3/005; H04R 2410/05; G10L 2021/02165; G10L 21/0208
USPC .......... 704/226–228, 275; 381/92, 94.1, 94.7, 381/71.1, 71.4, 86, 365, 389
See application file for complete search history.

(56) References Cited

U.S. PATENT DOCUMENTS 1,732,722 A * 10/1929 Horn ............................. 381/160
3,502,811 A * 3/1970 Schroeder et al. ............... 381/91
(Continued)

FOREIGN PATENT DOCUMENTS

JP       02-246599 A     10/1990
JP       07-231495 A      8/1995
(Continued)

OTHER PUBLICATIONS

International Search Report for PCT/JP2011/077997 dated Jan. 17, 2012.

*Primary Examiner* — Michael N Opsasnick
*Assistant Examiner* — Kee Young Lee
(74) *Attorney, Agent, or Firm* — Sughrue Mion, PLLC

(57) ABSTRACT

A speech processing apparatus acquires pseudo speech from a mixture of sound including desired speech and noise. A first microphone inputs a first mixture sound, including desired speech and noise, and outputs a first mixture signal. A second microphone opens to the sound space and is disposed at a focus position of an interface, that is part of a boundary of the sound space and has one of a quadratic surface shape and a pseudo surface shape approximating a quadratic surface, inputs a second mixture sound including the desired speech reflected by the interface and the noise reflected by the interface at a ratio different from the first mixture sound, and outputs a second mixture signal. A noise suppression circuit suppresses an estimated noise signal based on the first mixture signal and the second mixture signal and outputs a pseudo speech signal.

9 Claims, 11 Drawing Sheets

(51) Int. Cl.
*G10L 15/20* (2006.01)
*H04R 1/34* (2006.01)

(56) References Cited

U.S. PATENT DOCUMENTS

| | | | |
|---|---|---|---|
| 5,452,364 A * | 9/1995 | Bonham | 381/92 |
| 5,850,060 A * | 12/1998 | Gerber | G10K 11/28 181/141 |
| 6,438,238 B1 * | 8/2002 | Callahan | 381/67 |
| 2004/0047476 A1 * | 3/2004 | Sato | H04R 5/02 381/89 |
| 2004/0133426 A1 | 7/2004 | Kimura | |
| 2004/0228215 A1 | 11/2004 | Ichikawa et al. | |
| 2004/0246607 A1 * | 12/2004 | Watson | B60R 1/12 359/872 |
| 2005/0259831 A1 * | 11/2005 | Hutt | H04R 1/345 381/86 |
| 2006/0093128 A1 * | 5/2006 | Oxford | 379/406.01 |
| 2007/0116298 A1 * | 5/2007 | Holmi | H04R 5/02 381/86 |
| 2008/0273711 A1 * | 11/2008 | Broussard | H04B 1/3822 381/86 |
| 2009/0055170 A1 * | 2/2009 | Nagahama | 704/226 |
| 2009/0136053 A1 * | 5/2009 | Michiyoshi | 381/71.1 |
| 2009/0192795 A1 * | 7/2009 | Cech | 704/233 |
| 2009/0232328 A1 * | 9/2009 | DeLine | B60R 1/12 381/86 |
| 2010/0100374 A1 * | 4/2010 | Park et al. | 704/226 |
| 2010/0217586 A1 * | 8/2010 | Shimada et al. | 704/226 |
| 2010/0217587 A1 * | 8/2010 | Sato et al. | 704/226 |
| 2010/0232616 A1 * | 9/2010 | Chamberlain et al. | 381/71.1 |
| 2010/0232621 A1 * | 9/2010 | Aichner et al. | 381/94.1 |

FOREIGN PATENT DOCUMENTS

| | | |
|---|---|---|
| JP | 10-224882 A | 8/1998 |
| JP | 2004-215066 A | 7/2004 |
| JP | 2004-279241 A | 10/2004 |
| JP | 2006-108986 A | 4/2006 |
| JP | 2006108986 A * | 4/2006 |
| WO | 2009/051132 A1 | 4/2009 |

* cited by examiner

851

| 901 | 902 | 903 | 904 | 905 | 906 | 907 | 908 |
|---|---|---|---|---|---|---|---|
| SECOND MICROPHONE POSITION | PSEUDO SPEECH SIGNAL | ESTIMATED NOISE SIGNAL | PSEUDO NOISE SIGNAL | ESTIMATED SPEECH SIGNAL | NF PARAMETER | XF PARAMETER | EVALUATION |
| DASHBOARD | E1-1 | Y1-1 | E2-1 | Y2-1 | NF-1 | XF-1 | GOOD |
| REAR PACKAGE TRAY | E1-2 | Y1-2 | E2-2 | Y2-2 | NF-2 | XF-2 | FAIR |
| ⋮ | ⋮ | ⋮ | ⋮ | ⋮ | ⋮ | ⋮ | ⋮ |

FIG. 9

SPEECH PROCESSING APPARATUS, CONTROL METHOD THEREOF, STORAGE MEDIUM STORING CONTROL PROGRAM THEREOF, AND VEHICLE, INFORMATION PROCESSING APPARATUS, AND INFORMATION PROCESSING SYSTEM INCLUDING THE SPEECH PROCESSING APPARATUS

This is a National Stage Entry of Application No. PCT/JP2011/077997 filed Dec. 3, 2011, claiming priority based on Japanese Patent Application No. 2011-005317 filed Jan. 13, 2011, the contents of all of which are incorporated herein by reference in their entirety.

TECHNICAL FIELD

The present invention relates to a technique of acquiring pseudo speech from a mixture sound including desired speech and noise.

BACKGROUND ART

In the above-described technical field, patent literature 1 discloses a technique of suppressing, in a vehicle, noise that has come from outside the car and mixed with speech in the car. In patent literature 1, the outside-car noise is suppressed using an adaptive filter based on the output signal of a microphone that picks up the in-car speech and the output signal of a microphone that picks up the outside-car noise. In addition, patent literature 2 discloses a technique of clearly collecting a remote sound by combining sound collection using a parabolic reflector and sound collection using an ultra-directional microphone.

CITATION LIST

Patent Literature

Patent literature 1: Japanese Patent Laid-Open No. 2-246599
Patent literature 2: Japanese Patent Laid-Open No. 10-224882

SUMMARY OF THE INVENTION

Technical Problem

However, the technique of patent literature 1 aims at suppressing noise in a sound space (in this case, outside the car) different from a sound space where the desired speech exists. It is therefore impossible to suppress noise components generated from a plurality of noise sources in the sound space where the desired speech exists. To obtain pseudo speech close to the desired speech when a plurality of noise sources exist in the same sound space, the microphone for noise input needs to receive noise within a wide range of the sound space. However, patent literature 1 mentions no contrivance to collect noise in a wide range. In patent literature 2, speech at the focus position is collected using a parabolic reflector. However, it is the desired speech that is collected to clearly collect the speech from a remote site in cooperation with the ultra-directional microphone, and the technique does not aim at collecting noise.

The present invention enables to provide a technique of solving the above-described problem.

Solution to Problem

One aspect of the present invention provides a speech processing apparatus comprising:
a first microphone that inputs a first mixture sound including desired speech and noise and outputs a first mixture signal;
a second microphone that is opened to the same sound space as that of the first microphone and disposed at a focus position of an interface that is part of a boundary of the sound space and has one of a quadratic surface shape and a pseudo surface shape approximating a quadratic surface, inputs a second mixture sound including the desired speech reflected by the interface and the noise reflected by the interface at a ratio different from the first mixture sound, and outputs a second mixture signal; and
a noise suppression circuit that suppresses an estimated noise signal based on the first mixture signal and the second mixture signal and outputs a pseudo speech signal.

Another aspect of the present invention provides a vehicle including the speech processing apparatus,
wherein the first microphone is disposed at a position to input the first mixture sound including speech uttered by an occupant in a car that is the sound space, and
the second microphone is disposed at a position where noise generated by a noise source in the car is reflected by the interface of the car and collected to the second microphone.

Still another aspect of the present invention provides an information processing apparatus including the speech processing apparatus,
wherein the first microphone is disposed at a position to input the first mixture sound including speech uttered by an operator of the information processing apparatus, and
the second microphone is disposed at a position where noise generated by a noise source in a room in which the information processing apparatus is used is reflected by a wall and collected to the second microphone.

Still another aspect of the present invention provides an information processing system including the speech processing apparatus comprising:
a speech recognition apparatus that recognizes desired speech from the pseudo speech signal output from the speech processing apparatus; and
an information processing apparatus that processes information in accordance with the desired speech recognized by the speech recognition apparatus.

Still another aspect of the present invention provides a control method of a speech processing apparatus including:
a first microphone that inputs a first mixture sound including desired speech and noise and outputs a first mixture signal;
a second microphone that is opened to the same sound space as that of the first microphone, inputs a second mixture sound including the desired speech and the noise at a ratio different from the first mixture sound, and outputs a second mixture signal; and
a noise suppression circuit that suppresses an estimated noise signal based on the first mixture signal and the second mixture signal and outputs a pseudo speech signal, the method comprising:
acquiring a parameter of the noise suppression circuit; and
notifying, based on the parameter of the noise suppression circuit, whether a position of the second microphone is a focus position of an interface that is part of a boundary of the sound space and has one of a quadratic surface shape and a pseudo surface shape approximating a quadratic surface, at which the noise generated in the sound space is collected.

Still another aspect of the present invention provides a non-transitory computer-readable storage medium storing a control program of a speech processing apparatus including:

a first microphone that inputs a first mixture sound including desired speech and noise and outputs a first mixture signal;

a second microphone that is opened to the same sound space as that of the first microphone, inputs a second mixture sound including the desired speech and the noise at a ratio different from the first mixture sound, and outputs a second mixture signal; and a noise suppression circuit that suppresses an estimated noise signal based on the first mixture signal and the second mixture signal and outputs a pseudo speech signal, the control program causing a computer to execute:

acquiring a parameter of the noise suppression circuit; and notifying, based on the parameter of the noise suppression circuit, whether a position of the second microphone is a focus position of an interface that is part of a boundary of the sound space and has one of a quadratic surface shape and a pseudo surface shape approximating a quadratic surface, at which the noise generated in the sound space is collected.

Advantageous Effects of Invention

According to the present invention, it is possible to, in a single sound space where desired speech and noise components from a plurality of noise sources mix, collect the noise components from the plurality of noise sources including the echo of the desired speech uttered by a speaker, thereby correctly estimating the noise and reconstructing pseudo speech close to the desired speech.

BRIEF DESCRIPTION OF THE DRAWINGS

FIG. 9 is a view showing the arrangement of a signal/parameter accumulator according to the fourth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

Figure 1:
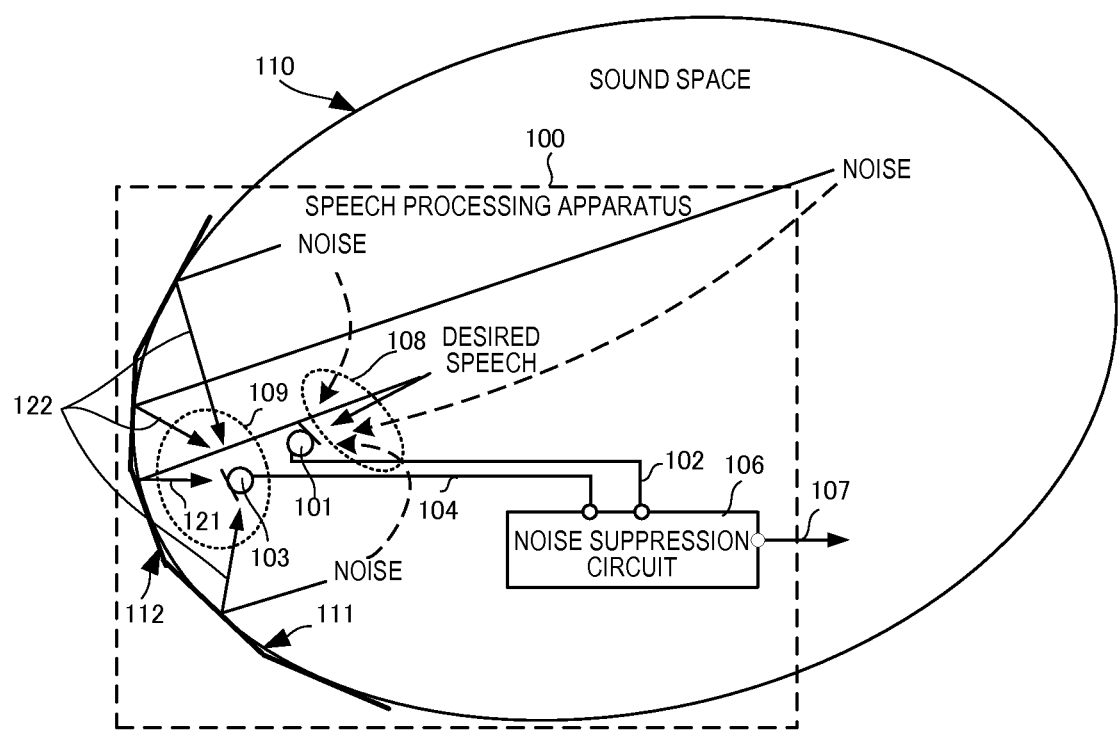
FIG. 1 is a block diagram showing the arrangement of a speech processing apparatus according to the first embodiment of the present invention.

A speech processing apparatus 100 according to the first embodiment of the present invention will be described with reference to FIG. 1. As shown in FIG. 1, the speech processing apparatus 100 includes a first microphone 101, a second microphone 103, and a noise suppression circuit 106. The first microphone 101 inputs a first mixture sound 108 including desired speech and noise, and outputs a first mixture signal 102. The second microphone 103 is opened to a sound space 110 that is the same as the sound space of the first microphone 101 and disposed at the focus position of the interface that is part of the boundary of the sound space 110 and has a quadratic surface shape 111 or a pseudo surface shape 112 approximating a quadratic surface. The second microphone 103 inputs a second mixture sound 109 including desired speech 121 reflected by the interface and noise 122 reflected by the interface at a ratio different from the first mixture sound 108, and outputs a second mixture signal 104. The noise suppression circuit 106 suppresses an estimated noise signal based on the first mixture signal 102 and the second mixture signal 104, and outputs a pseudo speech signal 107.

According to this embodiment, it is possible to, in a single sound space where desired speech and noise components from a plurality of noise sources mix, collect the noise components from the plurality of noise sources including the echo of the desired speech uttered by a speaker, thereby correctly estimating the noise and reconstructing pseudo speech close to the desired speech.

[Second Embodiment]

In the second embodiment, a speech processing apparatus according to the present invention is applied to a vehicle that is an information processing system, and noise is correctly estimated in the sound space of the vehicle, and pseudo speech close to desired speech is reconstructed. In the second embodiment, the first microphone and the second microphone are disposed on a dashboard as an integral speech input unit. According to this embodiment, even if a plurality of noise sources exist in the vehicle, the second microphone can collect the noise in a wide range. It is therefore possible to correctly estimate the noise and reconstruct pseudo speech close to desired speech. It is also possible to suppress the echo of the desired speech uttered by the speaker.

<Arrangement of Speech Processing System Including Speech Processing Apparatus According to this Embodiment>

Figure 2:
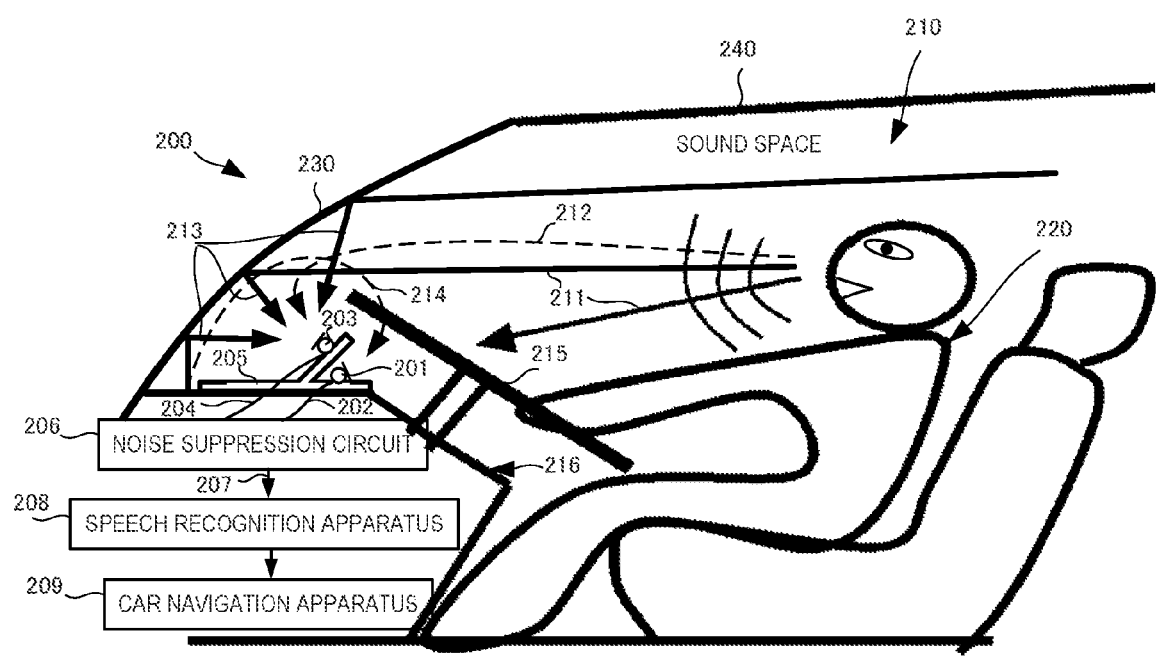
FIG. 2 is a block diagram showing the arrangement of a speech processing system including a speech processing apparatus according to the second embodiment of the present invention.

FIG. 2 is a block diagram showing the arrangement of a speech processing system 200 including a speech processing apparatus according to this embodiment. Note that referring to FIG. 2, the speech processing apparatus includes a first microphone 201, a second microphone 203, a microphone support member 205, and a noise suppression circuit 206. The speech processing system 200 includes the speech processing apparatus, and additionally, a speech recognition apparatus 208 and a car navigation apparatus 209. Note that the microphone support member 205 is preferably a sound insulator. The first microphone 201, the second microphone 203, and the microphone support member 205 may be provided as an integral speech input unit.

The sound insulator preferably uses a substance having a large mass and a high density. Such a substance needs a larger energy to oscillate and can therefore prevent a sound from passing through. The sound insulator preferably uses a hard material for the surface and a soft material for the interior. A hard material easily reflects a sound. For this reason, when a hard material is used for the surface of the sound insulator, a sound reflected by the sound insulator can also be collected in addition to a sound directly input to the microphone. A soft material easily absorbs a sound. For this reason, when a soft material is used for the interior of the sound insulator, unnecessary sound penetration can be prevented. The surface part on the first microphone side and the surface part on the second microphone side are preferably not continuous but separated. In a continuous structure, a sound propagates through the surface part and passes through the sound insulator. To prevent this, the sound insulator preferably has a three-layer structure in which a part made of a soft material is sandwiched between two surface parts made of a hard material.

Referring to FIG. 2, a sound space 210 is the space in a vehicle. The sound space 210 shown in FIG. 2 is partially delimited by a windshield 230 and a ceiling 240. The arrangement and operation of the second embodiment will be described below by exemplifying a case in which an occupant 220 manipulates the car navigation apparatus 209 by speech in the sound space 210 where noise components from a plurality of noise sources such as an air conditioner mix. Note that the air conditioner is assumed to exist in a dashboard 216. The noise source is not limited to only the air conditioner, and may be another occupant or another device disposed at another position. The speech of the occupant 220 need not always be used to manipulate the car navigation apparatus 209.

In the speech processing apparatus according to this embodiment, the first microphone 201, the second microphone 203, and the microphone support member 205 are disposed on the dashboard 216 on the front side of the car. The first microphone 201 is disposed at a portion of the microphone support member 205 attached to the dashboard 216. The second microphone is disposed at a portion that projects at an acute angle from the dashboard 216 into the car. The angle of the projecting portion of the microphone support member 205 is not limited to the acute angle, and an appropriate angle is selected in accordance with the structure in the car, the shape and position of the windshield, the structure and position of the dashboard, the seat position, the height of the occupant, the position of the noise source, and the like. Note that the microphone support member 205 is preferably located at a position where speech uttered by the occupant 220 can be collected. The microphone support member 205 may be installed, for example, behind a steering wheel 215. Note that the position of the first microphone 201 is not limited to this example.

Referring to FIG. 2, the second microphone 203 is attached to a position to input reflected noise components 213 that are noise components generated by the air conditioner in the dashboard 216 and other noise sources in the car and reflected by the windshield 230. That is, the second microphone 203 is attached to be disposed at the focus position of a quadratic surface or a pseudo surface approximating a quadratic surface formed by the windshield 230. The reflected noise components 213 include the reflected speech of the speech uttered by the occupant 220. In general, out of the reflected speech that is speech generated from a target sound source and reflected by a wall, glass, or the like, speech that has delayed by a predetermined time or more (for example, 20 msec or more) as compared to the direct sound adversely affects speech recognition. Hence, this speech needs to be regarded as noise and suppressed. In this embodiment, the speech reflected by the wall, glass, or the like is also regarded as noise and equally suppressed. For this reason, not only noise from a noise source but also such an echo of speech uttered by the occupant can be suppressed.

When the microphone support member 205 is a sound insulator, the microphone support member 205 shields input of airborne noise from the air conditioner or the like to the first microphone 201. At the same time, the microphone support member 205 shields input of airborne speech 211 uttered by the occupant 220 to the second microphone 203. Hence, the speech uttered by the occupant 220 is mainly input to the first microphone 201, and the reflected noise components 213 of the noise components generated by a plurality of noise sources, including the echo of the speech uttered by the occupant, are mainly input to the second microphone 203. However, since the microphone support member 205 does not form a closed space, airborne noise 214 getting around the microphone support member 205 mixes into the first microphone 201. In addition, airborne speech 212 getting around the microphone support member 205 mixes into the second microphone 203.

The first microphone 201 converts a first mixture sound including the input airborne speech 211 and the airborne noise 214 that has got around into a first mixture signal 202 including a speech signal and a noise signal and transmits it to the noise suppression circuit 206. On the other hand, the second microphone 203 receives a second mixture sound including the reflected noise components 213 and the airborne speech 212 that has got around at a ratio different from the first mixture sound. The second microphone 203 converts the second mixture sound into a second mixture signal 204 including a speech signal and a noise signal at a ratio different from the first mixture signal and transmits it to the noise suppression circuit 206.

The noise suppression circuit 206 outputs a pseudo speech signal 207 based on the transmitted first mixture signal 202 and second mixture signal 204. The pseudo speech signal 207 is recognized by the speech recognition apparatus 208 and processed by the car navigation apparatus 209 as a manipulation by the speech of the occupant 220.

In the above-described way, in the sound space 210 of the vehicle where the desired speech and the in-car noise mix, speech uttered by the occupant 220 and indicating a manipulation of the car navigation apparatus 209 is input to the first microphone 201 and the second microphone 203 as mixture sounds of different mixture ratios. The noise suppression circuit 206 reconstructs the pseudo speech signal based on the first mixture signal from the first microphone 201 and the second mixture signal from the second microphone 203. The speech recognition apparatus 208 recognizes the reconstructed pseudo speech signal. The car navigation apparatus 209 is manipulated by the recognized speech.

Note that the signal lines that transmit the first mixture signal 202 and the second mixture signal 204 may transmit the return signal of a ground power supply or the like or a power supply for operating the microphone. The noise suppression circuit 206 may be attached to the microphone support member 205. In this case, the pseudo speech signal is transmitted from the noise suppression circuit 206 to the speech recognition apparatus 208 through a signal line. In this embodiment, speech recognition and car navigation will be explained. However, the present invention is not limited to this, and correct reconstruction of the speech uttered by the occupant 220 is useful in another processing as well. For example, application to an automobile telephone or application to a vehicle manipulation that is not directly associated with driving is also possible.

<Explanation of Noise Collection According to this Embodiment>

Sound collection by a quadratic surface or a pseudo surface approximating a quadratic surface to its focus position will be described below with reference to FIG. 3 concerning the quadratic surface and FIG. 4 concerning the pseudo surface approximating a quadratic surface. Note that although FIGS. 3 and 4 explain an ideal quadratic surface or pseudo surface, a surface similar to a quadratic surface or pseudo surface such as the windshield shown in FIG. 2 is used in the sound space of the vehicle.

(Noise Collection by Quadratic Surface)

Figure 3:
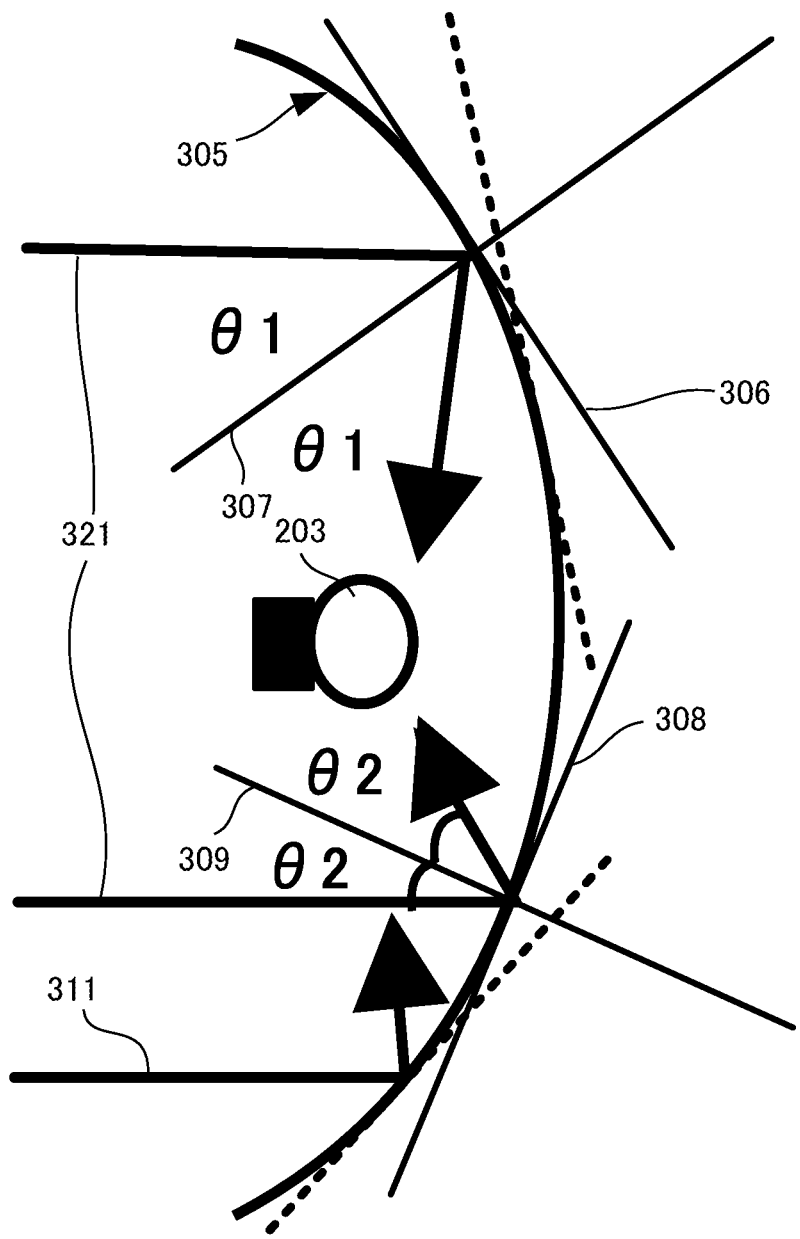
FIG. 3 is a view for explaining noise collection by a quadratic surface according to the second embodiment of the present invention.

FIG. 3 is a view for explaining noise collection by the windshield 230 having the quadratic surface according to this embodiment to the second microphone 203.

Referring to FIG. 3, line segments 306 and 308 are the tangential lines of a quadratic surface 305. Noise components 321 from a plurality of noise sources are reflected at equal angles θ1 and θ2 with respect to normals 307 and 309 that perpendicularly cross the line segments 306 and 308 at the contacts to the quadratic surface 305, respectively. Desired speech 311 from a speech source is also reflected in a similar manner. The plurality of noise components 321 and the desired speech 311 are collected to the second microphone 203 located at the focal point of the quadratic surface 305.

(Sound Collection by Sound Collector of Pseudo Surface)

Figure 4:
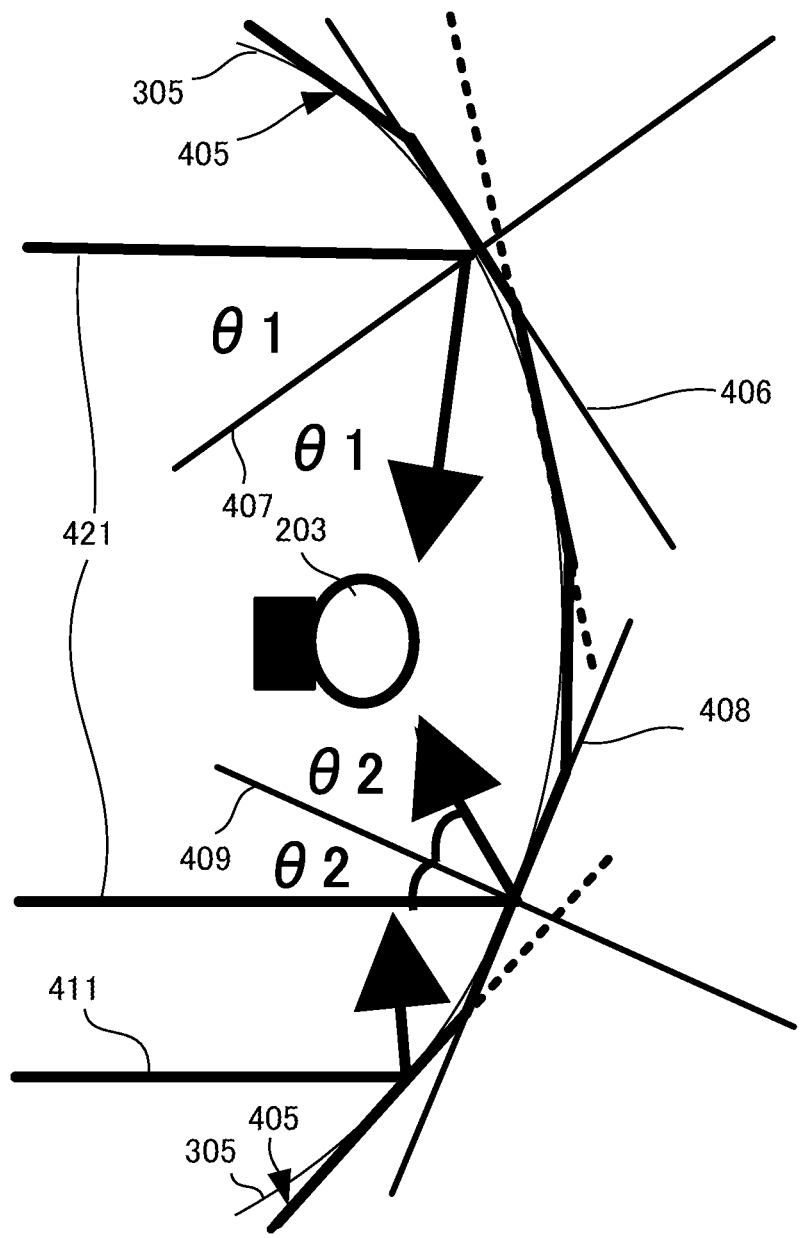
FIG. 4 is a view for explaining noise collection by a pseudo surface according to the second embodiment of the present invention.

FIG. 4 is a view for explaining noise collection to the second microphone 203 when a pseudo surface 405 according to this embodiment is provided. The pseudo surface 405 is an aggregate of planes extending in the tangential directions of the quadratic surface 305.

Referring to FIG. 4, line segments 406 and 408 indicate surfaces of the pseudo surface 405. Noise components 421 from a plurality of noise sources are reflected at the equal angles θ1 and θ2 with respect to normals 407 and 409 that perpendicularly cross the line segments 406 and 408, respectively. The desired speech 411 from the speech source is also reflected in a similar manner. The plurality of noise components 421 and the desired speech 411 are collected to the second microphone 203 located at the focal point of the pseudo surface 405 of the quadratic surface 305.

<Arrangement of Noise Suppression Circuit>

Figure 5:
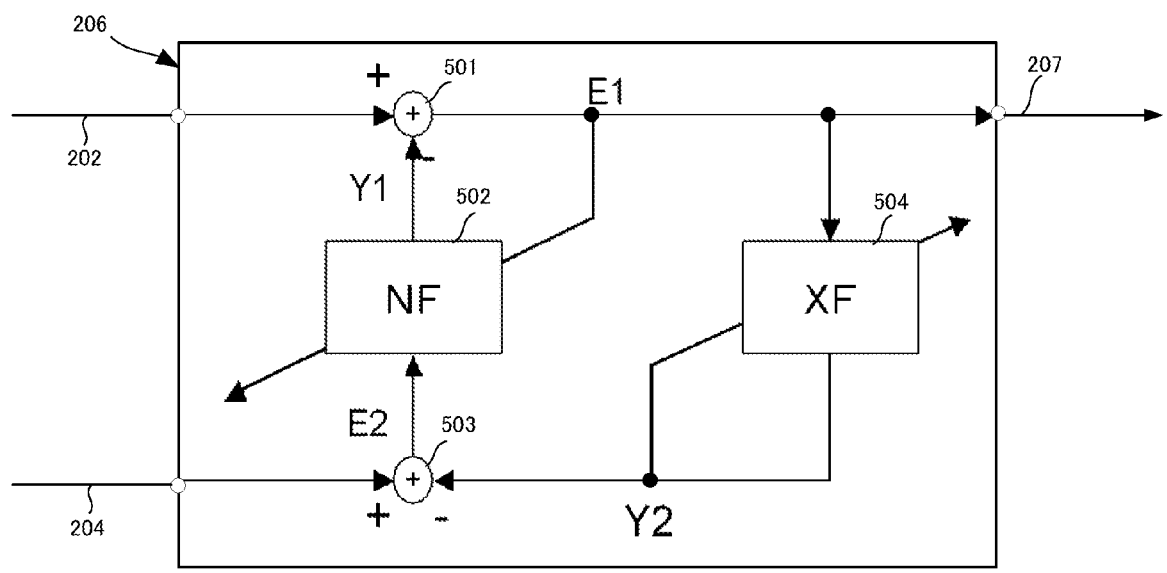
FIG. 5 is a view showing the arrangement of a noise suppression circuit according to the second embodiment of the present invention.

FIG. 5 is a view showing the arrangement of the noise suppression circuit 206 according to this embodiment.

The noise suppression circuit 206 includes a subtracter 501 that subtracts, from the first mixture signal 202, an estimated noise signal Y1 estimated to be included in the first mixture signal 202. The noise suppression circuit 206 also includes a subtracter 503 that subtracts, from the second mixture signal 204, an estimated speech signal Y2 estimated to be included in the second mixture signal 204. The noise suppression circuit 206 also includes an adaptive filter NF 502 serving as an estimated noise signal generator that generates the estimated noise signal Y1 from a pseudo noise signal E2 output from the subtracter 503. The noise suppression circuit 206 also includes an adaptive filter XF 504 serving as an estimated speech signal generator that generates the estimated speech signal Y2 from a pseudo speech signal E1 (207) output from the subtracter 503. A detailed example of the adaptive filter XF 504 is described in International Publication No. 2005/024787. Even when the target speech gets around and is input to the second microphone 203, and the second mixture signal 204 includes the speech signal, the adaptive filter XF 504 can prevent the subtracter 501 from erroneously removing the speech signal of the speech that has got around from the first mixture signal 202.

With this arrangement, the subtracter 501 subtracts the estimated noise signal Y1 from the first mixture signal 202 transmitted from the first microphone 201 and outputs the pseudo speech signal E1 (207).

The estimated noise signal Y1 is generated from the pseudo noise signal E2 by the adaptive filter NF 302 using a parameter that changes based on the pseudo speech signal E1 (207). The pseudo noise signal E2 is obtained by causing the subtracter 503 to subtract the estimated speech signal Y2 from the second mixture signal 204 transmitted from the second microphone 203 through a signal line.

The estimated speech signal Y2 is generated from the pseudo speech signal E1 (207) by the adaptive filter XF 504 using a parameter that changes based on the estimated speech signal Y2.

Note that the noise suppression circuit 206 can be an analog circuit, a digital circuit, or a circuit including both. When the noise suppression circuit 206 is an analog circuit, and the pseudo speech signal E1 (207) is used for digital control, an A/D converter converts the signal into a digital signal. On the other hand, when the noise suppression circuit 206 is a digital circuit, the signal from the microphone is converted into a digital signal by an A/D converter before input to the noise suppression circuit 206. If both an analog circuit and a digital circuit are included, for example, the subtracter 501 or 503 may be formed from an analog circuit, and the adaptive filter NF 502 or the adaptive filter XF 504 is formed from an analog circuit controlled by a digital circuit. The noise suppression circuit 206 shown in FIG. 5 is one of examples of the circuit suitable for this embodiment. An existing circuit that subtracts the estimated noise signal from the first mixture signal and outputs the pseudo speech signal is usable. The characteristic structure of this embodiment including the two microphones and the sound insulator enables to suppress noise. For example, the adaptive filter XF 504 shown in FIG. 5 may be replaced with a circuit that outputs a predetermined level to filter diffused speech. The subtracter 501 and/or the subtracter 503 may be replaced with an integrator by expressing a coefficient for integrating the estimated noise signal Y1 or the estimated speech signal Y2 with the first mixture signal 202 or the second mixture signal 204.

[Third Embodiment]

In the second embodiment, the first microphone and the second microphone are disposed on the dashboard as an integral speech input unit. However, in-car noise cannot always be collected by reflecting noise on the windshield. For example, in a structure that generates large noise on the rear side in a car, the second microphone disposed on the dashboard may be unable to collect the noise. In this embodiment, an example will be described in which the second microphone is separated from the first microphone and disposed on a rear tray panel. According to this embodiment, even in the structure that generates large noise on the rear side in a car, the second microphone can collect the noise in a wide range. It is therefore possible to correctly estimate the noise and reconstruct pseudo speech close to desired speech. It is also possible to suppress the echo of the desired speech uttered by a speaker.

Note that a description of the same processing as in the second embodiment will be omitted, and only different points will be described below.

<Arrangement of Speech Processing System Including Speech Processing Apparatus According to this Embodiment>

Figure 6:
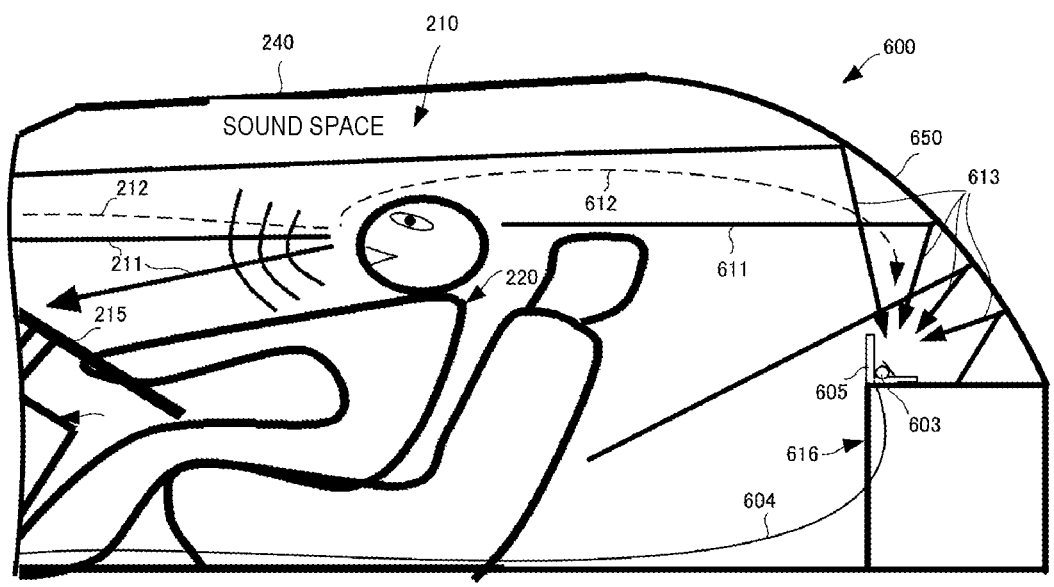
FIG. 6 is a block diagram showing the arrangement of a speech processing system including a speech processing apparatus according to the third embodiment of the present invention.

FIG. 6 is a block diagram showing the arrangement of a speech processing system 600 including a speech processing apparatus according to this embodiment. Note that referring to FIG. 6, the speech processing apparatus includes a first microphone 201 (not shown), a first microphone support member (not shown), a second microphone 603, a second microphone support member 605, and a noise suppression circuit 206 (as in FIG. 2). The speech processing system 600 includes the speech processing apparatus, and additionally, a speech recognition apparatus 208 and a car navigation apparatus 209, as in FIG. 2. Note that the second microphone support member 605 is preferably a sound insulator.

Referring to FIG. 6, a sound space 210 is the space in a vehicle. The sound space 210 shown in FIG. 6 is partially delimited by a ceiling 240 and a rear window 650. The arrangement and operation of the third embodiment will be described below by exemplifying a case in which an occupant 220 manipulates the car navigation apparatus 209 by speech in the sound space 210 where noise components from a plurality of noise sources mix. Note that one of the noise sources is assumed to exist in a rear tray panel 616. The speech of the occupant 220 need not always be used to manipulate the car navigation apparatus 209.

In the speech processing apparatus according to this embodiment, the second microphone 603 and the second microphone support member 605 are disposed on the rear tray panel 616 on the rear side in the car. The second microphone 603 is disposed at a portion of the second microphone support member 605 attached to the rear tray panel 616. As the angle of the projecting portion of the second microphone support member 605, an appropriate angle is selected in accordance with the structure in the car, the shape and position of the rear window, the structure and position of the rear tray panel, the seat position, the height of the occupant, the position of the noise source, and the like. Note that in this embodiment, the first microphone and the first microphone support member need only be disposed at a position where the speech uttered by the occupant 220 can be collected and are not particularly limited.

Referring to FIG. 6, the second microphone 603 is attached to a position to input reflected noise components 613 that are noise components generated by the noise suppression circuit in the rear tray panel 616 and other noise sources in the car and reflected by the rear window 650. That is, the second microphone 603 is attached to be disposed at the focus position of a quadratic surface or a pseudo surface approximating a quadratic surface formed by the rear window 650. The reflected noise components 613 include the reflected speech of the speech uttered by the occupant 220. In general, out of the reflected speech that is speech generated from a target sound source and reflected by a wall, glass, or the like, speech that has delayed by a predetermined time or more (for example, 20 msec or more) as compared to the direct sound adversely affects speech recognition. Hence, this speech needs to be regarded as noise and suppressed. In this embodiment, the speech reflected by the wall, glass, or the like is also regarded as noise and equally suppressed. For this reason, not only noise from a noise source but also such an echo of speech uttered by the occupant can be suppressed.

When the second microphone support member 605 is a sound insulator, the second microphone support member 605 shields direct input of in-car noise or airborne speech 611 uttered by the occupant 220 to the second microphone 603. Hence, the reflected noise components 613 of the noise components generated by a plurality of noise sources, including the echo of the speech uttered by the occupant, are mainly input to the second microphone 603. However, since the second microphone support member 605 does not form a closed space, airborne speech 612 getting around the second microphone support member 605 mixes into the second microphone 603.

The first microphone 201 (not shown) converts a first mixture sound including input airborne speech 211 and airborne noise 214 that has got around into a first mixture signal 202 including a speech signal and a noise signal and transmits it to the noise suppression circuit 206, as in FIG. 2. On the other hand, the second microphone 603 receives a second mixture sound including the reflected noise components 613 and the airborne speech 612 that has got around at a ratio different from the first mixture sound. The second microphone 603 converts the second mixture sound into a second mixture signal 604 including a speech signal and a noise signal at a ratio different from the first mixture signal and transmits it to the noise suppression circuit 206.

As in FIG. 2, the noise suppression circuit 206 outputs a pseudo speech signal 207 based on the transmitted first mixture signal 202 and the second mixture signal 604 like the second mixture signal 204. The pseudo speech signal 207 is recognized by the speech recognition apparatus 208 and processed by the car navigation apparatus 209 as a manipulation by the speech of the occupant 220.

In the above-described way, in the sound space 210 of the vehicle where the desired speech and the in-car noise mix, speech uttered by the occupant 220 and indicating a manipulation of the car navigation apparatus 209 is input to the first microphone 201 and the second microphone 603 as mixture sounds of different mixture ratios. The noise suppression circuit 206 reconstructs the pseudo speech signal based on the first mixture signal 202 from the first microphone 201 and the second mixture signal 604 from the second microphone 603. The speech recognition apparatus 208 recognizes the reconstructed pseudo speech signal. The car navigation apparatus 209 is manipulated by the recognized speech.

Note that the signal line that transmits the second mixture signal 604 may transmit the return signal of a ground power supply or the like or a power supply for operating the microphone. In this embodiment, speech recognition and car navigation will be explained. However, the present invention is not limited to this, and correct reconstruction of the speech uttered by the occupant 220 is useful in another processing as well. For example, application to an automobile telephone or application to a vehicle manipulation that is not directly associated with driving is also possible.

[Fourth Embodiment]

In the second and third embodiments, the arrangement and operation concerning a vehicle in which the first microphone and the second microphone have already been disposed have been described. In the fourth embodiment, a speech processing apparatus for determining appropriate layouts of the first microphone and the second microphone and, more particularly, the layout of the second microphone in a vehicle having a variety of structures will be explained. According to this embodiment, it is possible to dispose the speech processing apparatus at a position where noise can correctly be estimated, and pseudo speech close to desired speech can be reconstructed.

<Arrangement of Speech Processing System Including Speech Processing Apparatus According to this Embodiment>

Figure 7:
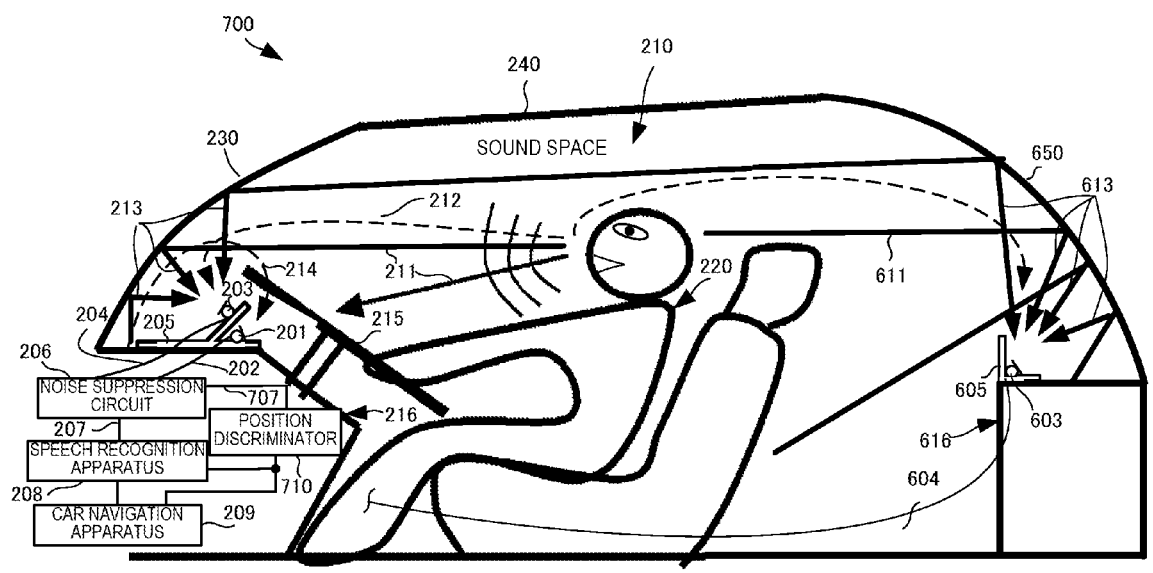
FIG. 7 is a block diagram showing the arrangement of a speech processing system including a speech processing apparatus according to the fourth embodiment of the present invention.

FIG. 7 is a block diagram showing the arrangement of a speech processing system including a speech processing apparatus according to this embodiment. Note that FIG. 7 is a block diagram showing a state of determining the disposing position of the second microphone according to this embodiment by combing FIGS. 2 and 6 and disposing the second microphone on the dashboard (see FIG. 2) or the rear tray panel (see FIG. 6). Since the difference between FIGS. 2 and 6 is only addition of a position discriminator 710, and a detailed description of the rest will be omitted.

The position discriminator 710 acquires a pseudo speech signal 207 and a parameter 707 from a noise suppression circuit 206. The position discriminator 710 then outputs, to a speech recognition apparatus 208 or a car navigation apparatus 209, information representing whether the first microphone and the second microphone are currently disposed at positions where noise can correctly be estimated, and pseudo speech close to desired speech can be reconstructed. The speech recognition apparatus 208 or the car navigation apparatus 209 notifies whether the microphones are disposed at positions where noise can correctly be estimated, and pseudo speech close to desired speech can be reconstructed. FIG. 7 illustrates, as microphone layout examples, a state in which a speech input unit that integrates a first microphone 201 and a second microphone 203 is disposed on a dashboard 216, as in FIG. 2, and a state in which a second microphone 603 is separated and disposed on a rear tray panel 616.

<Hardware Arrangement of Speech Processing Apparatus According to this Embodiment>

Figure 8:
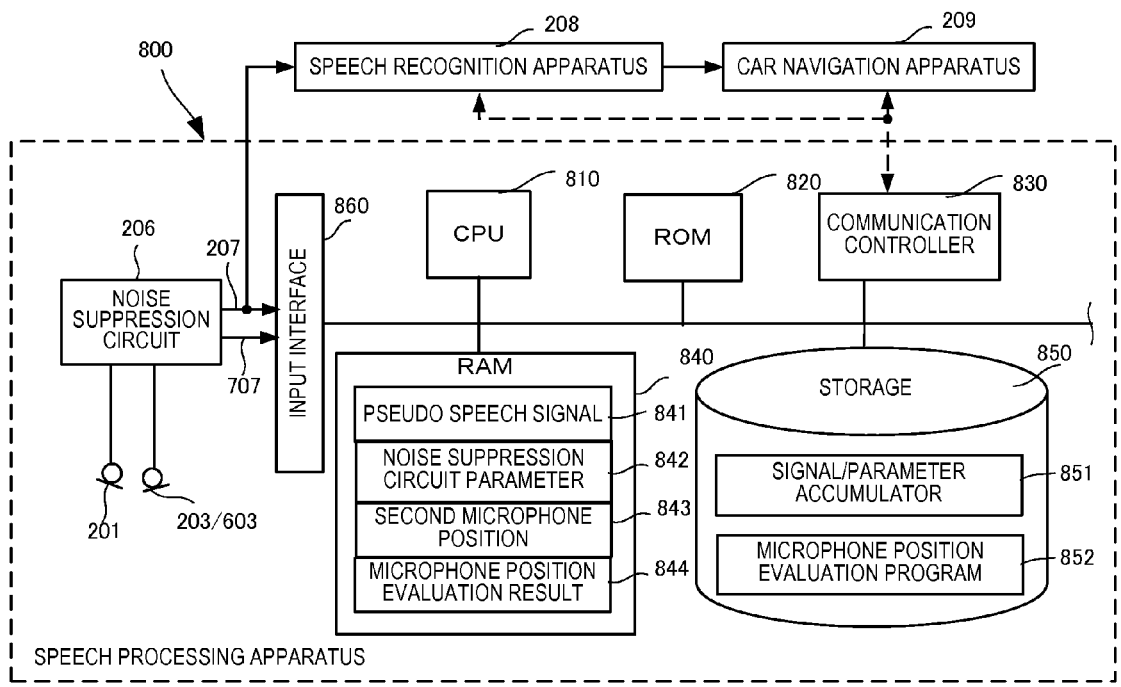
FIG. 8 is a block diagram showing the hardware arrangement of the speech processing apparatus according to the fourth embodiment of the present invention.

FIG. 8 is a block diagram showing the hardware arrangement of a speech processing apparatus 800 according to this embodiment. Note that FIG. 8 illustrates the speech recognition apparatus 208 and the car navigation apparatus 209 connected to the speech processing apparatus 800.

Referring to FIG. 8, a CPU 810 is a processor for arithmetic control and implements the controller of the speech processing apparatus 800 by executing a program. A ROM 820 stores initial data, permanent data of programs and the like, and the programs. A communication controller 830 exchanges information between the speech processing apparatus 800, the speech recognition apparatus 208, and the car navigation apparatus 209. The communication can be either wired or wireless. Note that FIG. 8 illustrates the noise suppression circuit 206 as a unique functional component. However, processing of the noise suppression circuit 206 may be implemented partially or wholly by processing of the CPU 810.

A RAM 840 is a random access memory used by the CPU 810 as a work area for temporary storage. Areas to store data necessary for implementing the embodiment are allocated in the RAM 840. The areas store digital data 841 of the pseudo speech signal 207 output from the noise suppression circuit 206 and a parameter 842 used in the noise suppression circuit 206. The RAM 840 also stores a second microphone disposing position 843 and a microphone position evaluation result 844 obtained by evaluating the noise input to the second microphone based on the strength of the speech signal, the ratio of the speech and noise, the parameter, and the like.

A storage 850 is a mass storage device that nonvolatilely stores databases, various kinds of parameters, and programs to be executed by the CPU 810. The storage 850 stores the following data and programs necessary for implementing the embodiment. As a data storage, the storage 850 stores a signal/parameter accumulator 851 that accumulates the second microphone position in association with the strength of the speech signal, the ratio of the speech and noise, the parameter, and the microphone position evaluation result (see FIG. 9). In this embodiment, the storage 850 stores, as a program, a microphone position evaluation program 852 used to evaluate noise input to the second microphone disposed at various positions.

An input interface 860 inputs control signals and data necessary for control by the CPU 810. In this embodiment, the input interface 860 inputs the pseudo speech signal 207 output from the noise suppression circuit 206 and a parameter of an adaptive filter NF 502 or an adaptive filter XF 504 or the parameter 707 of an estimated noise signal Y1 or the like. The parameter 707 is used to evaluate the position of the second microphone.

Note that FIG. 8 illustrates only the data and programs indispensable in this embodiment but not general-purpose data and programs such as the OS. The CPU 810 in FIG. 8 may also control the speech recognition apparatus 208 or the car navigation apparatus 209.

(Arrangement of Signal/Parameter Accumulator)

FIG. 9 is a view showing the arrangement of the signal/parameter accumulator 851 according to this embodiment.

The signal/parameter accumulator 851 stores the following information in association with a second microphone position 901. The signal/parameter accumulator 851 stores a pseudo speech signal 902, an estimated noise signal 903, a pseudo noise signal 904, an estimated speech signal 905, a parameter 906 of the adaptive filter NF, and a parameter 907 of the adaptive filter XF acquired from the noise suppression circuit 206. A microphone position evaluation 908 is stored in association with the conditions. "Good" represents an appropriate position for noise suppression, and "fair" represents a possible position that is not necessarily excellent. However, the present invention is not limited to those.

<Procedure of Microphone Position Evaluation According to this Embodiment>

Figure 10:
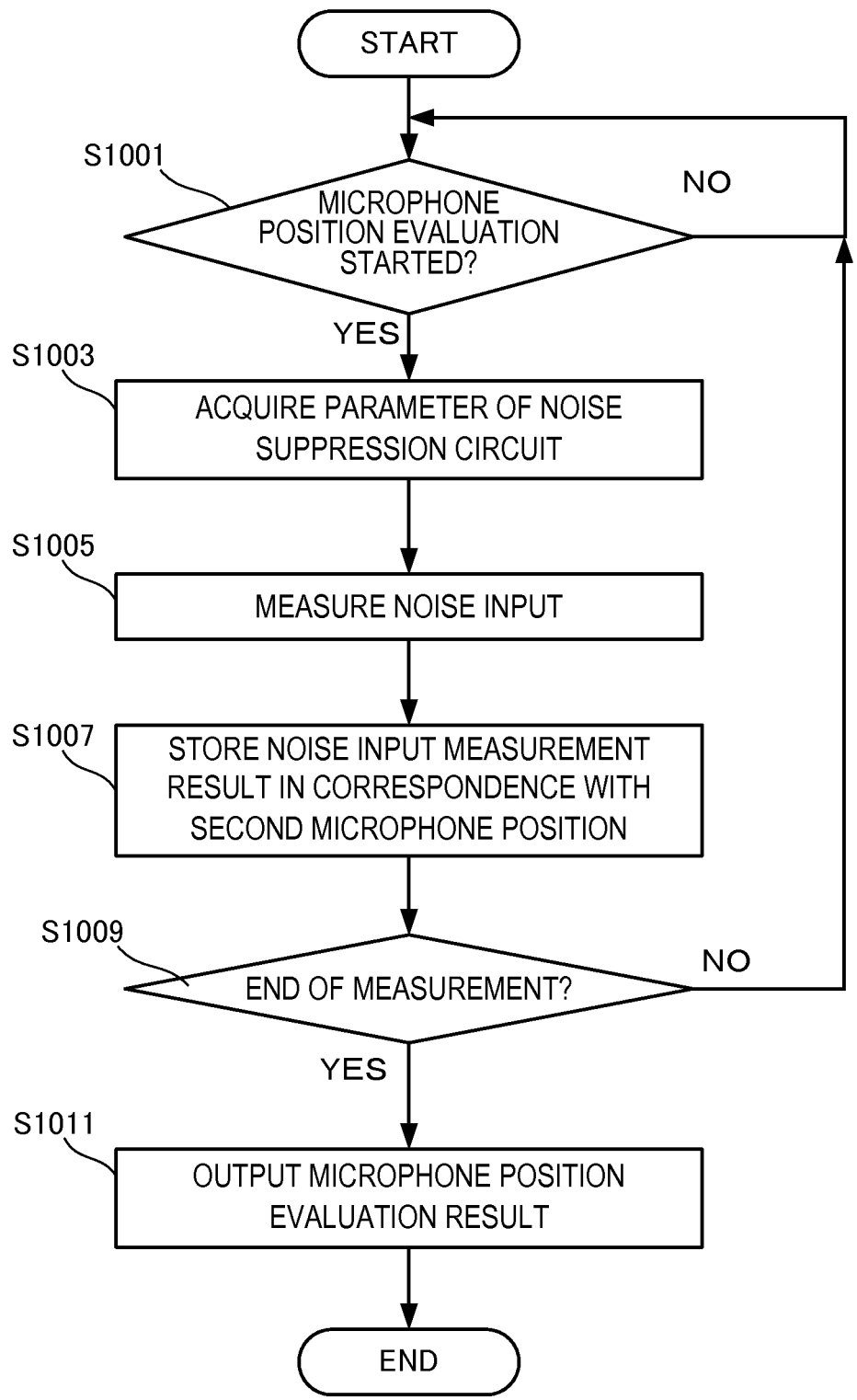
FIG. 10 is a flowchart showing the procedure of microphone position evaluation according to the fourth embodiment of the present invention.

FIG. 10 is a flowchart showing the procedure of microphone position evaluation according to this embodiment. The CPU 810 shown in FIG. 8 executes the flowchart of FIG. 10 using the RAM 840, thereby implementing the position discriminator 710 shown in FIG. 7. Note that this flowchart is executed at the timing of, for example, initialization or installation/detachment of a new device. The flowchart may also be executed when the speech recognition of the speech recognition apparatus has failed or when the noise input has been judged to be small based on a pseudo noise signal E2 in the noise suppression circuit or the parameter of the adaptive filter NF.

In step S1001, it is judged whether to start evaluation of the second microphone position. When the first microphone and the second microphone are disposed, and measurement of noise input to the second microphone starts, a parameter is acquired from the noise suppression circuit 206 in step S1003. In step S1005, the second microphone position is evaluated based on the pseudo speech signal and the parameter from the noise suppression circuit 206. In step S1007, the second microphone position evaluation result is stored in association with the second microphone position.

In step S1009, it is judged whether an instruction to end the evaluation of the positions where the first microphone and the second microphone can be disposed has been received. Without the instruction to end the measurement, the process returns to step S1001 to wait for the next layouts of the first microphone and the second microphone. Then, the processes of steps S1003 to S1007 are repeated. Upon receiving the instruction to end the measurement, the most preferable position or information at that time is output from the second microphone position evaluation result accumulated so far to the speech recognition apparatus 208 or the car navigation apparatus 209.

[Fifth Embodiment]

In the second to fourth embodiments, examples in which the speech processing apparatus of the present invention is applied to a vehicle have been described. In the fifth embodiment, an example will be described in which the speech processing apparatus of the present invention is applied to, for example, a notebook personal computer (to be abbreviated as a notebook PC hereinafter). According to this embodiment, it is possible to, when a notebook PC is used in a room, collect noise components including noise from a device in the room, speech of another person, and the echo of the speech of the user himself/herself in a wide range, correctly estimate the noise, and reconstruct pseudo speech close to desired speech.

<Arrangement of Speech Processing System Including Speech Processing Apparatus According to this Embodiment>

Figure 11:
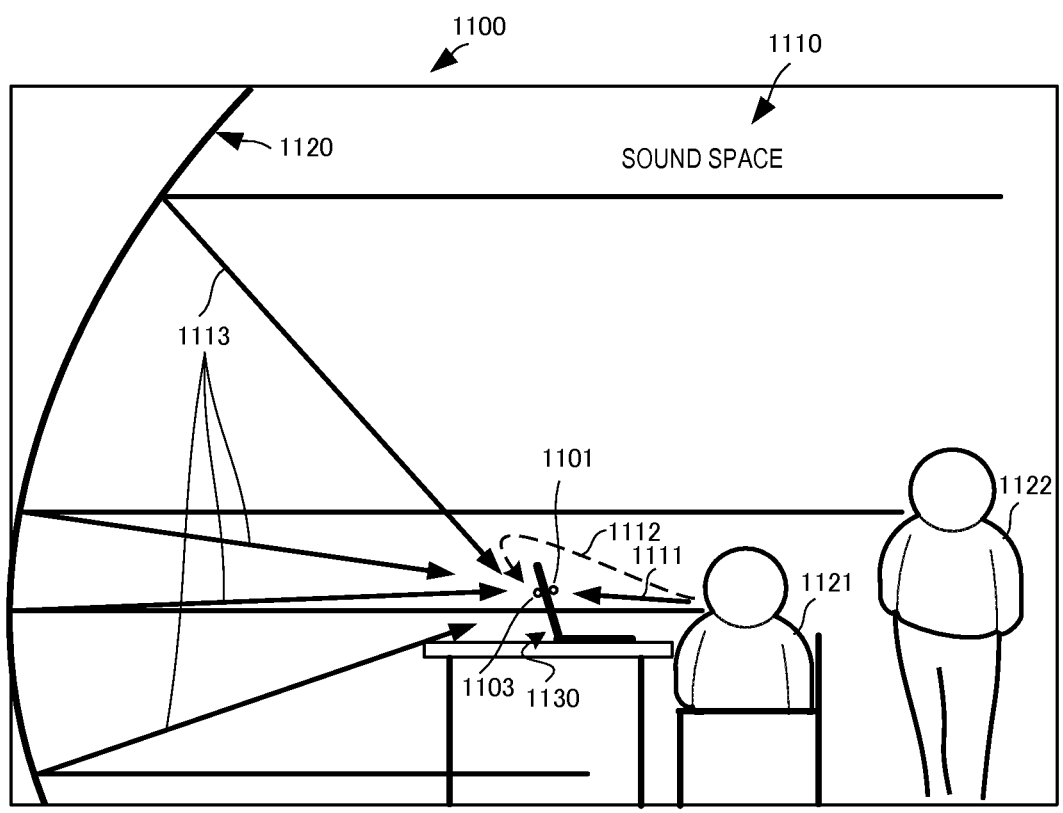
FIG. 11 is a block diagram showing the arrangement of a speech processing system including a speech processing apparatus according to the fifth embodiment of the present invention.

FIG. 11 is a block diagram showing an arrangement including a notebook PC 1130 that is a speech processing system 1100 including a speech processing apparatus according to this embodiment. Note that referring to FIG. 11, a description of the primary functions of the notebook PC will be omitted, and an arrangement concerning sound collection to a first microphone 1101 and a second microphone 1103 will be explained as the feature of this embodiment.

Referring to FIG. 11, the notebook PC 1130 includes a display portion including a display screen and a keyboard portion including a keyboard. In this embodiment, an example will be described in which the first microphone 1101 and the second microphone 1103 are disposed on the display portion. The first microphone 1101 is disposed on the operator side of the display portion. The second microphone 1103 is disposed on the side of the display portion opposite to the operator. However, the first microphone 1101 may be located on the keyboard portion.

The first microphone 1101 receives a first mixture sound including speech 1111 uttered by an operator 1121 and airborne noise (not shown) that has got around. The first microphone 1101 converts the first mixture sound into a first mixture signal including a speech signal and a noise signal and transmits it to a noise suppression circuit 206 (not shown). On the other hand, the second microphone 1103 receives a second mixture sound including noise components 1113 reflected by a quadratic surface 1120 or a pseudo surface approximating a quadratic surface and speech 1112 that has got around at a ratio different from the first mixture sound. The reflected noise components 1113 include an echo generated when the speech uttered by the operator 1121 is reflected by the quadratic surface 1120 or reflected speech generated when speech uttered by another person 1122 is reflected by the quadratic surface 1120. In general, out of the reflected speech that is speech generated from a target sound source and reflected by a wall, glass, or the like, speech that has delayed by a predetermined time or more (for example, 20 msec or more) as compared to the direct sound adversely affects speech recognition. Hence, this speech needs to be regarded as noise and suppressed. In this embodiment, the speech reflected by the wall, glass, or the like is also regarded as noise and equally suppressed. For this reason, not only noise from a noise source but also such an echo of speech uttered by the operator can be suppressed. The second microphone 1103 converts the second mixture sound into a second mixture signal including a speech signal and a noise signal at a ratio different from the first mixture signal and transmits it to the noise suppression circuit 206 (not shown).

The processing to be described below is the same as in the second to fourth embodiments. The noise suppression circuit 206 outputs a pseudo speech signal 207 based on the first mixture signal and the second mixture signal transmitted from the first microphone 1101 and the second microphone 1103, respectively. The pseudo speech signal 207 is recognized by a speech recognition apparatus 208 and processed by the notebook PC 1130 as a manipulation by speech or speech input of data by the operator 1121.

In the above-described way, in the sound space where the desired speech and indoor noise mix, speech uttered by the operator 1121 to the notebook PC 1130 and the indoor noise are input to the first microphone 1101 and the second microphone 1103 that inputs the noise components including the reflected speech as mixture sounds of different mixture ratios. The noise suppression circuit 206 reconstructs the pseudo speech signal based on the first mixture signal from the first microphone 301 and the second mixture signal from the second microphone 303. The speech recognition apparatus 208 recognizes the reconstructed pseudo speech signal. The notebook PC 1130 processes the recognized speech.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. The present invention also incorporates a system or apparatus that somehow combines different features included in the respective embodiments.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the control program installed in a computer to implement the functions of the present invention on the computer, a medium storing the control program, and a WWW (World Wide Web) server that causes a user to download the control program.

This application claims the benefit of Japanese Patent Application No. 2011-005317 filed on Jan. 13, 2011, which is hereby incorporated by reference herein in its entirety.

The invention claimed is:

1. A speech processing apparatus located in a vehicle comprising:
a first microphone configured to input, from a sound space in the vehicle, a first mixture sound including desired speech uttered by an occupant in the vehicle and noise in the vehicle at a first ratio of the noise to the desired speech, and to output a first mixture signal;
a second microphone opened to said sound space in the vehicle and configured to be disposed at a focus position of an interface, said interface being one of a windshield and a rear window of the vehicle as part of a boundary of the sound space and having one of a quadratic surface shape and a pseudo surface shape as an aggregate of planes extending in tangential directions of a quadratic surface for collecting the noise in the vehicle at the focus position, the second microphone being configured to input a second mixture sound at the focus position including the desired speech uttered by the occupant in the vehicle and the noise in the vehicle reflected by the interface, at a second ratio of the reflected noise to the desired speech different from the first ratio, and to output a second mixture signal; and a noise suppression circuit configured to suppress an estimated noise signal based on the first mixture signal and the second mixture signal, and to output a pseudo speech signal, wherein said first microphone is disposed at a position farther from the interface than the focus position and nearer to the occupant uttering the desired speech than said second microphone, so that the second ratio is larger than the first ratio.

2. The speech processing apparatus according to claim 1, wherein said first microphone and said second microphone are provided as an integral speech input unit.

3. The speech processing apparatus according to claim 1, further comprising a sound insulator disposed in the vehicle and between said first microphone and said second microphone.

4. The speech processing apparatus according to claim 3, wherein said sound insulator is disposed at a position in the vehicle to prevent the desired speech and the noise from being directly input to said second microphone without being reflected by the interface.

5. The speech processing apparatus according to claim 1, further comprising an output unit that outputs, based on one of the pseudo speech signal, the estimated noise signal, and a parameter of said noise suppression circuit, information representing whether a position of said second microphone is a position to collect the noise in the vehicle.

6. The speech processing apparatus according to claim 1, wherein said noise suppression circuit comprises:
- a first subtracter that subtracts the estimated noise signal estimated to be included in the first mixture signal from the first mixture signal;
- a second subtracter that subtracts an estimated speech signal estimated to be included in the second mixture signal from the second mixture signal;
- an estimated noise signal generator that generates the estimated noise signal from an output signal of said second subtracter; and
- an estimated speech signal generator that generates the estimated speech signal from an output signal of said first subtracter, and
- the pseudo speech signal is the output signal of said first subtracter.

7. An information processing system including a speech processing apparatus of claim 1, comprising:
- a speech recognition apparatus that recognizes desired speech from the pseudo speech signal output from the speech processing apparatus; and
- an information processing apparatus that processes information in accordance with the desired speech recognized by said speech recognition apparatus.

8. A control method of a speech processing apparatus located in a vehicle, comprising:

acquiring a first mixture signal converted from a first mixture sound including desired speech uttered by an occupant in the vehicle and noise in the vehicle, at a first ratio of the noise to the desired speech, in a first microphone that is disposed at a position farther from an interface than a focus position of the interface and near to a speaker giving the desired speech, said interface being one of a windshield and a rear window of the vehicle as a part of a boundary of a sound space in the vehicle and having one of a quadratic surface shape and a pseudo surface shape as an aggregate of planes extending in tangential directions of a quadratic surface for collection the noise in the vehicle at the focus position;

acquiring a second mixture signal converted from a second mixture sound including the desired speech uttered by the occupant in the vehicle and the noise in the vehicle collected at a focus position of said interface by said interface, at a second ratio of the noise to the desired speech larger than the first ratio, in a second microphone opened to said sound space and disposed at the focus position of said interface;

acquiring a pseudo speech signal and parameters from a noise suppression circuit that is configured to suppress an estimated noise signal based on the first mixture signal and the second mixture signal; and notifying, based on the pseudo speech signal and the parameters, whether the position of the second microphone is the focus position of the interface in the vehicle.

9. A non-transitory computer-readable storage medium storing a control program of a speech processing apparatus located in a vehicle, the control program comprising:

acquiring a first mixture signal converted from a first mixture sound including desired speech uttered by an occupant in the vehicle and noise in the vehicle, at a first ratio of the noise to the desired speech, in a first microphone that is disposed at a position farther from an interface than a focus position of the interface and near to a speaker giving the desired speech, said interface being one of a windshield and a rear window of the vehicle as part of a boundary of a sound space in the vehicle and having one of a quadratic surface shape and a pseudo surface shape as an aggregate of planes extending in tangential directions of a quadratic surface for collecting the noise in the vehicle at the focus position;

acquiring a second mixture signal converted from a second mixture sound including the desired speech uttered by the occupant in the vehicle and the noise in the vehicle collected at a focus position of said interface by said interface, at a second ratio of the noise to the desired speech larger than the first ratio in a second microphone opened to said sound space and disposed at the focus position of said interface;

acquiring a pseudo speech signal and parameters from a noise suppression circuit that is configured to suppress an estimated noise signal based on the first mixture signal and the second mixture signal; and notifying, based on the pseudo speech signal and the parameters, whether the position of the second microphone is the focus position of the interface in the vehicle.

* * * * *